UNITED STATES PATENT OFFICE.

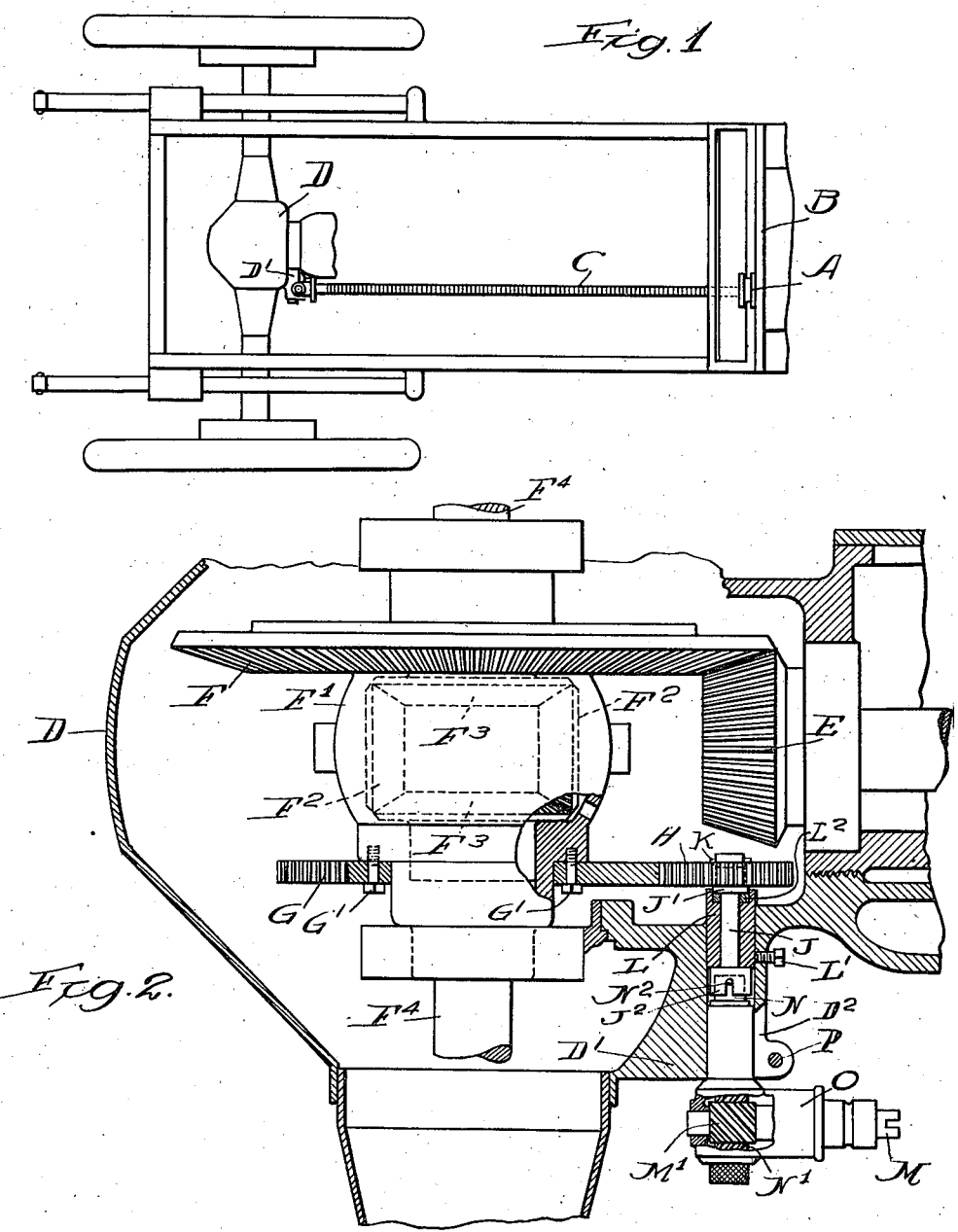

FRANK A. ROSS, OF EVANSTON, ILLINOIS, ASSIGNOR TO STEWART-WARNER SPEEDOMETER CORPORATION, OF CHICAGO, ILLINOIS, A CORPORATION OF VIRGINIA.

SPEEDOMETER DRIVE-TRAIN.

1,212,814.

Specification of Letters Patent.

Patented Jan. 16, 1917.

Application filed March 11, 1914. Serial No. 823,888.

*To all whom it may concern:*

Be it known that I, FRANK A. ROSS, a citizen of the United States, residing at Evanston, in the county of Cook and State of Illinois, have invented new and useful Improvements in Speedometer Drive-Trains, of which the following is a specification, reference being had to the accompanying drawings, forming a part thereof.

The purpose of this invention is to provide an improved drive train for a speedometer on a motor vehicle, particularly designed so that all gearing shall be inclosed.

It consists of the various elements and their combinations shown and described as indicated by the claim.

In the drawings, Figure 1 is a partial plan view of an automobile chassis, indicating the position of the drive train embodying this invention. Fig. 2 is a sectional view of the differential housing showing the gear train as mounted therein.

Fig. 1 indicates somewhat diagrammatically a speedometer, A, mounted in the customary position on the dash-board, B, of an automobile, and arranged to be driven through a shaft, C, extending from the speedometer, A, to the differential housing, D, at the rear axle of the vehicle. The shaft, C, will preferably be of the familiar "flexible" type incased in a flexible tubing, but may be any convenient form of jointed shaft adapted to transmit rotation to the speedometer, A. Within the differential housing, D, there is shown in Fig. 2 the customary propeller shaft pinion, E, meshing with a large bevel gear, F, the latter having a frame or casing, $F^1$, rigid with it in which are journaled the idler pinions, $F^2$, of the differential gear. These pinions mesh in the customary manner with bevel gears, $F^3$, rigid with the respective halves, $F^4$, of the rear axle for driving the road wheels.

The present invention is designed to take advantage of the differential housing, D, as an oil-tight inclosure for a gear train for actuating the speedometer, A. This train comprises a comparatively large spur gear, G, secured by screws, $G^1$, to the frame or casing, $F^1$, so as to rotate with it for driving a spur pinion, H, secured rigidly on a small shaft, J, which is journaled in a specially formed boss, $D^1$, of the differential housing. The pinion, H, preferably of fiber, is held on the shaft, J, against the flange, $J^1$, thereof, by means of a cross pin, K, engaging a slot in the face of the pinion, and the shaft, J, is journaled in a bushing, L, fixed in the boss, $D^1$, by a set screw, $L^1$, and fitted with a packing washer, $L^2$, to prevent the escape of lubricant.

A pair of short shafts, M and N, are journaled in a unitary right-angle fitting, O, and operatively connected by spiral gears, $M^1$ and $N^1$, one form of the angle fitting, O, being inserted in the bore of the boss, $D^1$, from the outside, and clamped therein by a clamp screw, P, operating to close the split portions of the boss at $D^2$. The shaft, N, is provided near its inner end with a cross pin, $N^2$, engaging the slotted cup-shaped terminal flange, $J^2$, of the shaft, J, and this completes the transmission train from the vehicle axle to the jointed shaft, C. The fitting, O, is so designed that it may be packed with sufficient heavy lubricant to last for several months, and as the arm of this fitting which carries the shaft, M, will be closely coupled to the containing tube of the flexible shaft, C, there will be practically no opportunity for leakage of such lubricant, while the ordinary lubricant already present in the differential housing, D, will keep the gears, G and H, well oiled at all times.

By mounting the gear, G, which drives the meter upon the frame, $F^1$, of the idler pinions of the differential gear train, the meter is caused to register the actual travel work done by the vehicle or the average travel or speed of the two wheels and the two axles, and not merely the travel or speed of either one, which might differ materially from the travel or speed of the vehicle as a whole, especially in the case of a vehicle traveling around a circular track or in any course in which a greater number of turns are made in one direction than the other.

I claim:—

In a power driven vehicle, in combination with a principal gear train through which the vehicle drive wheels are actuated, a fixed housing inclosing such principal gear train; a second gear train for actuating a mechanism carried by the vehicle, comprising a gear mounted within said housing and operatively connected with the principal train, the housing having an opening or aperture from its cavity to the outside; a shaft and a sleeve in which it is journaled, adapted to extend in and close the inner end of the aperture of the housing, and means exteriorly accessible for making said sleeve fast to the housing in said aperture; a pinion on said shaft at the inner end of the sleeve within the housing, and a coupling member on the shaft at the outer end of the sleeve adapted to serve as a stop-collar for preventing the shaft from escaping inwardly from the sleeve; a second gear housing, one end of which is adapted to be inserted from the outside of the principal housing into said aperture and to close the outer end thereof, a shaft in said second housing journaled in the end portion thereof which enters the aperture in the principal housing, and a coupling member on the end of said shaft adapted to coöperate with the coupling member on the outer end of the first mentioned shaft, and means for securing said second housing in the aperture of the first housing with said coupling members engaged with each other within said aperture.

In testimony whereof, I have hereunto set my hand at Chicago, this 5th day of March, 1914.

FRANK A. ROSS.

Witnesses:
R. H. WALPOLE,
W. A. ROSE.